J. J. BATE.

REFRIGERATING PROVISION-CARS.

No. 6,942. Reissued Feb. 22, 1876.

*Witnesses:*
H Wells Jr
Elbert Dearborn

*Inventor:*
John J Bate
per James A Whitney
Atty

UNITED STATES PATENT OFFICE.

JOHN J. BATE, OF BROOKLYN, NEW YORK, ASSIGNOR TO THE BATE REFRIGERATING COMPANY, OF NEW YORK CITY.

IMPROVEMENT IN REFRIGERATING PROVISION-CARS.

Specification forming part of Letters Patent No. 123,077, dated January 30, 1872; antedated January 15, 1872; reissue No. 6,942, dated February 22, 1876; application filed August 17, 1875.

*To all whom it may concern:*

Be it known that I, JOHN J. BATE, of the city of Brooklyn, in the State of New York, have invented certain Improvements in Refrigerating Provision-Cars, of which the following is a specification:

My invention relates to that class of cars commonly called provision-cars, and which are intended for the conveyance of fresh meats, game, &c., the distance between the point of departure and of delivery being so great as to require the use of some artificial means for the preservation of the meat, &c.

Figure 1:
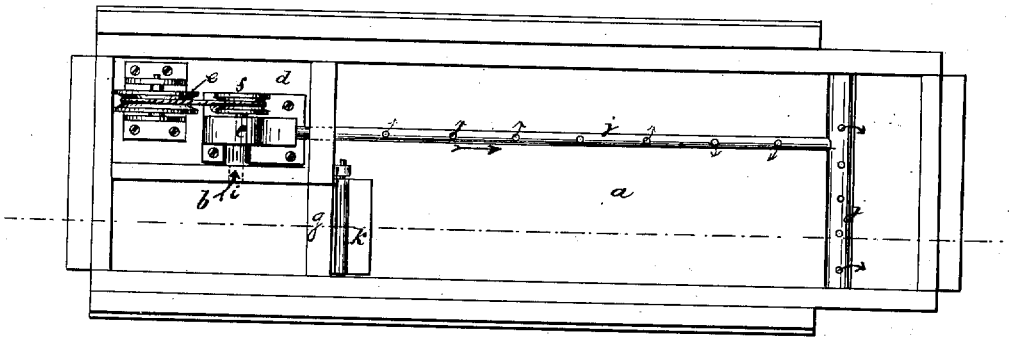
Figure 2:
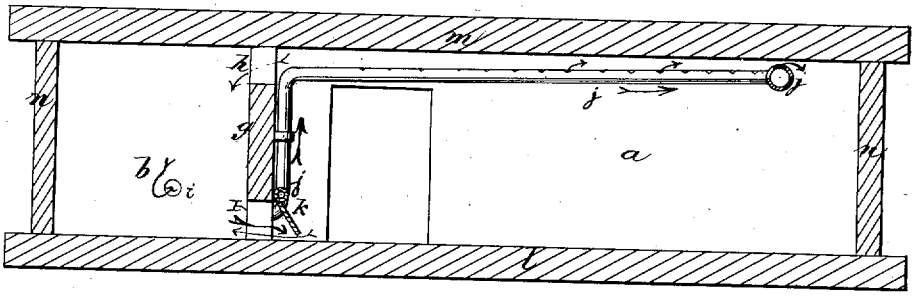

The accompanying drawing represents a car with my improvement forming a part thereof, Figure 1 being a view of the interior of the car, the roof being removed; and Fig. 2, a view by vertical section on the dotted line of Fig. 1.

The means shown by this drawing are designed to keep up a free circulation of air through the provision-chamber *a*, the air being used over and over again, and being forced through an ice-box, *b*, well filled with ice, by which the air is cooled, deprived of its moisture, and purified, so that the air circulating through the provision-chamber and the meats, &c., within the chambers will be kept in a sweet and pure condition. The circulation of air, when the car is in motion, is maintained by a blower or rotary fan, *c*, placed in the messenger's room *d*, or in the ice-box. The rotation of the fan is kept up by a band or cord passed around the axle of the car, around a pulley, *e*, and pulley *f* on the shaft of the fan, as is shown by Fig. 1. The air is brought over the partition *g*, between the ice-box and the provision-chamber, through the space *h*, conducted down through the ice to the entrance *i* of the blower, and passes from the blower, for distribution through the perforated pipe *j*. At the lower part of the partition *g* is a hinged door, *k*, by which an opening, *i*, is opened and closed. This door can be kept closed while the blower is in action, so that the entire air will pass through the space *h*, and down through the ice-box to the blower; or it may be opened to a greater or less extent for the passage of air through it, so that the strata of air nearest the bottom of the provision-chamber will be more fully drawn toward the blower than when the air is drawn through the space *h* only. When the blower is not in action, the car being at rest, by opening the door *k* there will be a circulation of the air from the provision-chamber through the door-space and space *h*, and through the ice-box, thus preventing a stagnation of air in the provision-chamber.

In the drawing, *l* indicates the floor of the car; *m*, the roof, and *n* the ends, of the car.

This arrangement of means for refrigerating the provision-chamber of cars may be applied to the like chambers of ware or provision houses, and chambers for keeping meats and provisions generally. When so adapted the fan-blower may be operated by any motive power at hand, or mechanical devices, convenient among which may be included clock-movements.

What I claim as my invention is—

1. In a closed refrigerating-chamber, the combination of the outlet-pipe *j*, at or near the bottom of the ice-box, with the air-forcing apparatus, to force the air of the chamber through the ice-box, to and through the said pipe, substantially as and for the purpose set forth.

2. The arrangement of the door *k* in relation to the air-spaces, ice-chamber, and tubes, for allowing the circulation of air when the car is not in motion or the blower in action, as herein recited, in combination with a blower or means for a forced circulation of the air, as described.

JOHN J. BATE.

Witnesses:

JAMES A. WHITNEY,
ELBERT DEARBORN.